US009549000B2

(12) United States Patent
Panje et al.

(10) Patent No.: US 9,549,000 B2
(45) Date of Patent: Jan. 17, 2017

(54) STREAMING MEDIA FROM A SERVER DELIVERING INDIVIDUALIZED CONTENT STREAMS TO CLIENTS

(71) Applicant: General Instrument Corporation, Horsham, PA (US)

(72) Inventors: Krishna Prasad Panje, Bangalore, IN (US); William P. Franks, San Diego, CA (US); Praveen N. Moorthy, San Diego, CA (US); Paul Moroney, La Jolla, CA (US); Murali Sahasranaman, Bangalore (IN)

(73) Assignee: ARRIS Enterprises, Inc., Suwanee, GA (US)

( * ) Notice: Subject to any disclaimer, the term of this patent is extended or adjusted under 35 U.S.C. 154(b) by 179 days.

(21) Appl. No.: 14/207,481

(22) Filed: Mar. 12, 2014

(65) Prior Publication Data

US 2014/0281010 A1    Sep. 18, 2014

Related U.S. Application Data

(60) Provisional application No. 61/794,638, filed on Mar. 15, 2013.

(51) Int. Cl.
*G06F 15/16* (2006.01)
*H04L 29/06* (2006.01)
(Continued)

(52) U.S. Cl.
CPC ......... *H04L 65/105* (2013.01); *H04L 65/4084* (2013.01); *H04L 65/60* (2013.01);
(Continued)

(58) Field of Classification Search
CPC .. H04L 65/105; H04L 65/4084; H04L 65/607; H04L 65/80; H04L 65/60; H04L 65/602
(Continued)

(56) References Cited

U.S. PATENT DOCUMENTS

2001/0044851 A1    11/2001 Rothman et al.
2009/0235349 A1    9/2009 Lai et al.
(Continued)

FOREIGN PATENT DOCUMENTS

WO           01/84336 A1      11/2001
WO    WO 2012089014 A1 *   7/2012   ......... H04N 21/6125

*Primary Examiner* — Chris Parry
*Assistant Examiner* — Weiwei Stiltner
(74) *Attorney, Agent, or Firm* — Thomas A. Ward

(57) ABSTRACT

A method for preparing media content to be streamed to a client divides a stream of the media content at the server into multiple media segments. Each of the multiple media segments is to be stored as an individual file in a memory in a transfer protocol compliant format. A top-level manifest file is generated, which has a plurality of Universal Resource Locators (URLs). The plurality of URLs indicates an ordering of the multiple media segments to recreate the stream of media content. Responsive to a client request received over a network to present the media content in a trick play mode of operation, a modified manifest file is obtained based on the top-level manifest file. The modified manifest file includes a subset of the plurality of URLs indicating an ordering of media segments that create a representation of the stream of media content presentable in the trick play mode of operation.

12 Claims, 7 Drawing Sheets

(51) Int. Cl.
*H04N 21/262* (2011.01)
*H04N 21/6587* (2011.01)
*H04N 21/845* (2011.01)

(52) U.S. Cl.
CPC .......... *H04L 65/602* (2013.01); *H04L 65/607* (2013.01); *H04L 65/608* (2013.01); *H04L 65/80* (2013.01); *H04N 21/26258* (2013.01); *H04N 21/6587* (2013.01); *H04N 21/8456* (2013.01)

(58) Field of Classification Search
USPC .................................................. 709/231, 203
See application file for complete search history.

(56) References Cited

U.S. PATENT DOCUMENTS

| | | |
|---|---|---|
| 2010/0169303 A1 | 7/2010 | Biderman et al. |
| 2010/0169453 A1 | 7/2010 | Biderman et al. |
| 2011/0041171 A1 | 2/2011 | Burch et al. |
| 2012/0260330 A1 | 10/2012 | Zlatarev et al. |
| 2012/0278497 A1 | 11/2012 | Hsu |
| 2013/0054728 A1* | 2/2013 | Amir .................. H04N 21/2183 709/213 |
| 2013/0159455 A1 | 6/2013 | Braskich et al. |
| 2013/0166906 A1 | 6/2013 | Swaminathan et al. |
| 2013/0239145 A1* | 9/2013 | Broome ................. G06Q 50/01 725/41 |
| 2013/0290859 A1 | 10/2013 | Venkitaraman et al. |
| 2013/0311670 A1 | 11/2013 | Tarbox et al. |
| 2014/0013376 A1 | 1/2014 | Xu et al. |
| 2014/0032531 A1 | 1/2014 | Ravi et al. |
| 2014/0136601 A1* | 5/2014 | Kent ..................... H04L 65/605 709/203 |
| 2014/0359680 A1* | 12/2014 | Shivadas ............ H04N 21/8455 725/90 |

* cited by examiner

Direction of Apparent Movement Through Program

`# STREAMING MEDIA FROM A SERVER DELIVERING INDIVIDUALIZED CONTENT STREAMS TO CLIENTS

CLAIM FOR PRIORITY

This application claims the benefit of U.S. Ser. No. 61/794,638, filed Mar. 15, 2013 and entitled: "TIME SHIFT BUFFER SUPPORT FOR STREAMER," which is hereby incorporated by reference in its entirety.

BACKGROUND

Streaming of media over a network from a content server to a media or client device has become a widely adopted technique for media consumption. Two network protocols used for media streaming include the user datagram protocol Internet protocol ("UDP IP") and the transfer control protocol ("TCP") IP. UDP IP is often used for media streaming for relatively reliable networks, such as in-home streaming over wired connections. TCP IP is often used for streaming over less reliable networks.

A content server may implement the streaming of media by first dividing a media program into segments or chunks which may vary in duration but are often about one second in length. The content server publishes a playlist or manifest file that is accessible to the client device. The manifest file includes a list of URLs ("Universal Resource Locators") to media segments that make up the program.

The hypertext transfer protocol ("HTTP") based live streaming ("HLS") protocol, used with TCP IP, allows a content server to publish variant manifest files to client devices. A variant manifest file identifies multiple sets of video streams for a media program, such as a movie, a television program, etc., where each set of video streams has unique encoding parameters (e.g., bit rates, resolutions, etc.) for the media program. The client devices may dynamically switch between the sets of video streams identified in the variant manifest file as the sets of video streams are transmitted from the content server to the client devices. The client devices may choose to receive an initial set of video streams identified in the variant manifest file based on initial network conditions, initial buffer conditions, etc. For example, the client devices may choose to receive a set of high definition ("HD") video streams identified in the variant manifest file if the initial network conditions, the initial buffer conditions, etc., support the streaming of the HD set of video streams. If the initial network conditions degrade, or if the initial buffer conditions degrade, etc., then the client devices may choose to receive a set of low definition video streams identified in the variant manifest file. That is, the client device may dynamically choose different sets of video streams to receive from the content server where the different sets of video streams have different encoding parameters.

The variant manifest files are dynamically updated by the server and thus the client devices need to periodically retrieve the files. If the manifest files contain the URLs for all the media segments in a program, the size of the files may be excessively large, which can consume a substantial amount of bandwidth and place a burden on the resources of the content server and the media player as the manifest files are periodically communicated between them. One way to reduce the size of the manifest files is to only include a limited number of media segments URLs which define a window specifying a small portion of the program. The window is a moving or sliding window that includes a limited number of media segments URLs in which URLs for media segments occurring earlier in time are removed as URL for media segments occurring later in time are added.

SUMMARY

In accordance with one aspect of the invention, trick-play modes operation (e.g., Pause, Fast Forward, Rewind) may be executed when the manifest file operates in rolling mode and the user attempts to access a portion of the program outside the current window. This result may be achieved, for example, by having the content server create manifests on a per client basis which are tailored to the specific operating mode that the user desires. That is, the server builds unique manifests, which are generally subsets of a master manifest for each client for a particular use case. Each unique manifest file is built to enable each client device to have random access to a master manifest without having to fetch or download a manifest file that includes an entire program.

In one particular implementation, a method is disclosed for preparing media content to be streamed to a client. In accordance with the method, a stream of the media content is divided at the server into multiple media segments. Each of the multiple media segments is to be stored as an individual file in a memory in a transfer protocol compliant format. A top-level manifest file is generated, which has a plurality of Universal Resource Locators (URLs). The plurality of URLs indicates an ordering of the multiple media segments to recreate the stream of media content. Responsive to a client request received over a network to present the media content in a trick play mode of operation, a modified manifest file is obtained based on the top-level manifest file. The modified manifest file includes a subset of the plurality of URLs indicating an ordering of media segments that create a representation of the stream of media content presentable in the trick play mode of operation.

DETAILED DESCRIPTION

Figure 1:
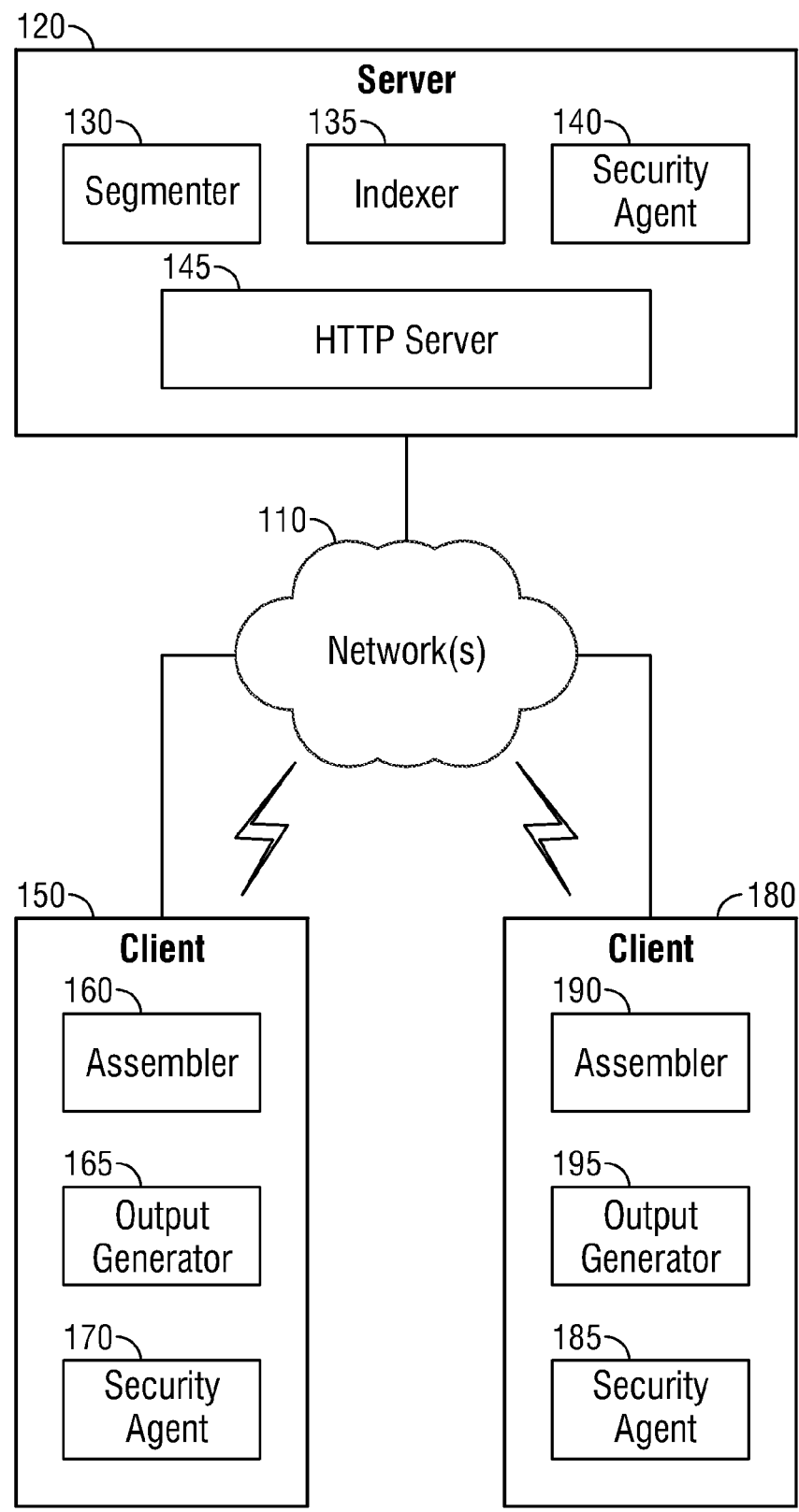
FIG. 1 is a block diagram of one embodiment of a server and clients that can send and receive streaming media.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

As used herein, "streaming media" are media received by and presented to an end-user while being delivered by a streaming provider using Adaptive Bit Rate ("ABR")` streaming methods. The name refers to the delivery method of the medium rather than to the medium itself. The distinction is usually applied to media that are distributed over telecommunications networks, e.g., "on-line," as most other delivery systems are either inherently streaming (e.g., radio, television) or inherently non-streaming (e.g., books, video cassettes, audio CDs). Hereinafter, on-line media and on-line streaming using ABR methods are referred to as "media" and "streaming," respectively.

ABR streaming is a technology that works by breaking the overall media stream or media file into a sequence of small HTTP-based file downloads, each download loading one short segment of an overall potentially unbounded transport stream or media elementary streams. As the stream is played, the client (e.g., the media player) may select from a number of different alternate streams containing the same material encoded at a variety of data rates, allowing the streaming session to adapt to the available data rate. At the start of the streaming session, the player downloads a manifest containing the metadata for the various sub-streams which are available. Since its requests use only standard HTTP transactions, ABR streaming is capable of traversing a firewall or proxy server that lets through standard HTTP traffic, unlike UDP-based protocols such as Real-Time Transport Protocol. This also allows a content delivery network to readily be implemented for any given stream. ABR-streaming methods have been implemented in proprietary formats including HTTP Live Streaming by Apple, Inc., and HTTP Smooth Streaming by Microsoft, Inc. ABR streaming has been standardized as ISO/IEC 23009-1, Information Technology—Dynamic adaptive streaming over HTTP: Part 1: Media presentation description and segment formats.

An increasing number of video playback devices prefer video content to be delivered via ABR streaming rather than streamed continuously. The playback device, using the HTTP Live Streaming format, receives the manifest as an m3u8 file that contains links, media uniform resource identifiers (URLs), to each of the segments or "chunks" of video content, and processes the manifest file to retrieve and play back each media segment in turn. In this disclosure, "HLS" represents the range of protocols that segment media content and employ a playlist or manifest file to manage playback.

FIG. 1 is a block diagram of one embodiment of a server and clients that can send and receive streaming media. The example of FIG. 1 provides a simple server-client connection with two clients coupled with a server via a network. Any number of clients may be supported utilizing the techniques and mechanisms described herein. Further, multiple servers may provide content and/or may operate together to provide content according to the techniques and mechanisms described herein. For example, one server may create the content, create the manifests and create the multiple media segments and other servers store and transmit the created content.

Server 120 may operate as a HTTP server in any manner known in the art. That is server 120 includes a HTTP server component 145 that provides content using HTTP protocols. While the example of FIG. 1 is described in terms of HTTP, other transfer protocols can be utilized in a similar manner. Segmenter 130 and indexer 135 are components that reside on server 120 (or multiple servers) to provide content in media segments with a manifest file as described herein. These media segments and manifest files may be provided over network 10 via HTTP server component 145 (or via other servers) using HTTP protocols. Components as discussed herein can be implemented as hardware, software, firmware or a combination thereof.

In one embodiment server 120 is a residential-based device such as a media gateway or streamer which collects various types of media content from one or more of numerous sources, for example, via satellite transmission, cable transmission, and the Internet. One example of such a device is the Televation Device™. In other embodiments server 120 may be associated with the content provider and may be located, for example, in a cable or satellite network headend.

Network 110 may be any type of network whether wired, wireless or any combination thereof. For example, network 100 may be the Internet or an intranet. If the server 120 is a residential based device then network 100 may be a wired and/or wireless Local Area Network (LAN) such as an IEEE 802.11 network. As another example, network 110 may be a cellular network (e.g., 3G, CDMA).

Turning to the internal components of server 120, segmenter 130 may function to divide the stream of media data into multiple media files or segments that may be transmitted via HTTP protocols. Indexer 135 may function to create a manifest file corresponding to the segmented media files so that client devices can reassemble the media segments to provide real-time, or near real-time, transmission of the content provided by server 120. In response to one or more requests from a client device, HTTP server component 145 (or other servers) may transmit one or more manifest files as generated by indexer 135 and media segments of content as generated by segmenter 130. Server 120 may further include optional security component 140 that provides one or more of the security functions (e.g. encryption) discussed herein. Server 120 may also include additional components not illustrated in FIG. 1.

Client devices 150 and 180 may receive the manifest files and media segments from server 120 over network 110. Client devices may be any type of electronic device that are capable of receiving data transmitted over a network and generate output utilizing the data received via the network, for example, wireless mobile devices, smartphones, PDAs, entertainment devices, consumer electronic devices, PCs, etc. The output may be any media type or combination of media types, including, for example, audio, video or any combination thereof.

Client device 150 can include assembler component 160 and output generator component 165. Similarly, client device 180 can include assembler component 190 and output generator component 195. Assembler components 160 and 180 receive the manifest files from server 120 and use the manifest files to access and download media segments from server 120. Output generator components 165 and 195 use the downloaded media segments to generate output from client devices 150 and 160, respectively. The output may be provided by one or more speakers, one or more display screens, a combination of speakers and display screens or any other input or output device. The client devices can also include memory (e.g. flash memory or DRAM, etc.) to act as a buffer to store the media segments (e.g. compressed media files or decompressed media files) as they are received; the buffer can provide many seconds worth of presentable content beyond the time of content currently being presented so that the buffered content can later be displayed while new content is being downloaded. This buffer can provide presentable content while the client device is attempting to retrieve content through an intermittently slow network connection and hence the buffer can hide network latency or connection problems.

Client devices 150 and 180 may further include optional security components 170 and 185, respectively that provide one or more of the security functions discussed herein. Client devices 150 and 180 may also include additional components not illustrated in FIG. 1.

A client device, e.g., client device 150 or 180, initiates communication with the server 120 by sending a request to the server 120 for playback of media content. The server 120 then generates or fetches a manifest file to send to the client device in response to the request. Example formats for the manifest file include the m3u and m3u8 formats. An m3u8 file is a specific variation of an m3u encoded using UTF-8 Unicode characters. The m3u file format was initially used in the WINAMP Media Player for audio-only files but has since become a de facto manifest standard on many client devices for local or streaming media, including music and other media types. Many client devices employ variations of the m3u file format, any of which can be used according to the present disclosure. A manifest file can include links to media segments as relative or absolute paths to a location on a local file system or as a network address, such as a URL path. The m3u8 format is used herein as a non-limiting example to illustrate the principles of manifest files including non-standard variants.

The manifest file includes a list of Uniform Resource Locators ("URLs") to different representations of the requested segmented media content. Before or at the time of the request, the server 120 generates or identifies the media segments of the requested media content as streaming media content. The media segments of the streaming media content are generated, either by the server 120, by the content producer, or by some other entity, by splitting, transcoding, or transrating the original media content. Upon receiving the manifest file, the server 120 can fetch a first media segment or chunk for playback from the streaming media content then, during playback of that media segment, fetch a next media segment for playback after the first media segment, and so on until the end of the media content is reached. Table 1 presents the contents of one example of an m3u manifest file for a 32-second video program. The manifest file includes URLs for 4 media segments denoted chunk1.ts to chunk4.ts

TABLE 1

EXTM3U
EXT-X-MEDIA-SEQUENCE:0
EXT-X-TARGETDURATION:10
EXTINF:10,
http://streaming.exampleurl.com/chunk1.ts
EXTINF:10,
http://streaming.exampleurl.com/chunk3.ts
EXTINF:2,
http://streaming.exampleurl.com/chunk4.ts
EXT-X-ENDLIST The illustrative manifest file shown in Table 1 is an extended M3U manifest that employs tags that effectively extend the M3U format. The tags can be used by the server to organize, transmit and process the media segments that represent the original media content. The client devices use this information to reassemble and present the media segments. For instance, the EXT-X-MEDIA-SEQUENCE tag can indicate the sequence number of the first URL that appears in a manifest file. Likewise, the EXT-X-TARGET-DURATION tag can indicate the approximate duration of the next media segment that will be added to the presentation.

In one embodiment, the server can operate in either cumulative mode or in rolling mode. In cumulative mode, the server can create a manifest file and append URLs to the end of the manifest file. The client device then has access to all parts of the stream from a single manifest file (e.g., a user can start at the middle of a show) when downloaded. In rolling mode, the server may limit the availability of media segments by removing URLs from the beginning of the manifest file on a rolling basis, thereby providing a sliding window of media content accessible to a client device. The server can also add URLs to the manifest and, in rolling mode, the server can limit the availability of media segments to those that have been most recently added to the manifest. The client then repeatedly downloads updated copies of the manifest file to continue viewing. The client can continue to repeatedly request the manifest in the rolling mode until it finds an end tag in the manifest.

One problem with operation in cumulative mode is that the size of the manifest file can quickly become unmanageably large. For example, if 1 second chunks are delivered the manifest file will eventually include 3600 URLs for a one hour program. This may not be easily manageable, since reading such a larger file can be time and processing intensive and since the URL's need to be updated periodically. This problem may be particularly acute if the server is a limited capability device of the type that resides on the customer premises and which operates in a limited bandwidth environment such as Wi-Fi, which limits the rate at which the client device can access the manifest file. Accordingly, in many cases the server operates in rolling mode. In this way the manifest file can be limited in size, avoiding the aforementioned problems that arise when operating in cumulative mode.

However, one problem that arises when streaming media is delivered using a manifest file that operates in rolling mode is that since only a limited portion of the program is specified in the manifest file, the use of trick-play operations (e.g., Pause, Fast Forward, Rewind) when accessing a portion of the program outside the window can become difficult. Before discussing how this problem can be addressed, an overview will be provided explaining how still image data and trick-play operations may be presented to a user.

Figure 2:
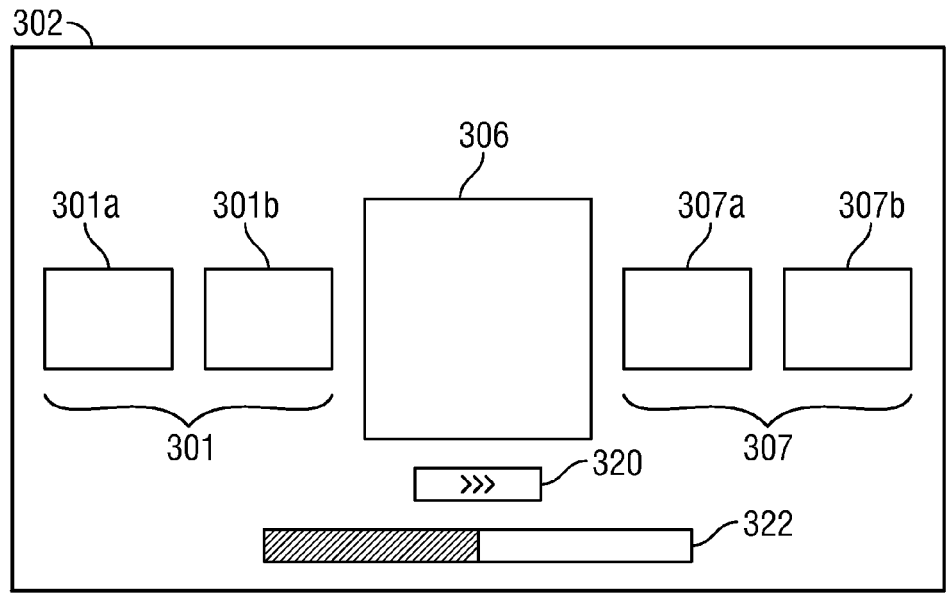
FIGS. 2-4 illustrate example displays of multiple still images from a media content item such as a video program for the purpose of explaining how still image data and trick play operation may be presented to a user.

FIG. 2 illustrates an example display of multiple still images from a media content item such as a video program. As shown, there are two still images in a first image position, one still image in a second image position, and two still images in a third image position, as displayed in a video display for use in a trick play of streaming media. Each of the still images may be, for example, a JPEG still graphical image and is not displayed directly from the video stream for the program. In an embodiment, a screen display 302 on a video monitor or similar device comprises a first image position 301 comprising one or more still images 301A, 301B, a second image position 306 comprising one still image, and a third image position 307 comprising one or more other still images 307A, 307B. Image positions 301, 306, and 307 display still images that were generated from the video program. The still images are displayed in sequential order as they appear in the video program with the first or earliest images in position 301 and last or later images in position 307. The screen display 302 also may comprise a movement icon 320 and a progress bar 322.

In an embodiment, a streaming media processor (e.g., output generator 165 in client device 150) displays screen display 302 in response to user input from an input device requesting a navigation or seek function. For example, assume that a user is viewing a movie using the client device 150 and a streaming video protocol and then presses a "fast forward" button on client device 150 or selects and drags the slider of a media-player application. In response to this action, the output generator 165 changes the display to show screen display 302. The output generator 165 no longer displays the streaming media but displays a set of still images 301, 306, 307 that have been sampled from the movie or program in the form represented in screen display 302. In an embodiment, a full-screen, full-motion display of the program is changed to screen display 302 which shows five of the still images in successive positions 301, 306, 307. Further, the images in display 302 move successively from right to left as fast forward control proceeds. In one embodiment the streaming video is frozen, and the still image or images 301, 306, 307 are overlaid on top of the frozen video, which may be darkened or dimmed to emphasize the overlaid stills.

In one embodiment, output generator 165 displays screen display 302 in response to the user selecting and dragging the slider of a media-player application residing on a client device. In response to this action, the media-player application replaces or overlays the display, which generates and sends a forward or rewind command to output generator 165 depending on the direction the slider is moved. In response to the forward or rewind command, the media-player application replaces or overlays the display of the streaming media with a set of still images representing the content of the program at a time point close to that represented by the position of the slider. Further, images in display 302 may move successively from right to left or left to right as the user continues to drag the slider forward or backward. When the user releases the slider, or pauses dragging the slider for a period of time, the output generator 165 may begin to re-buffer the content at a time point close to that represented by the position of the slider. When a sufficient portion of the media at the new time point is buffered, the output generator 165 replaces the displayed still images with playback of the buffered content.

While FIG. 2 illustrates a screen display comprising three images positions 301, 306, and 307, the screen display may comprise more than three image positions or less than three image positions. For example, screen display 302 may comprise a single image position comprising one of the still images. Continuing the example, as a forward or rewind command is received by output generator 165, the displayed still image is replaced with a sequentially adjacent still image from still images (e.g., the next nearest still image to the time point of the replaced still image in the time direction of the navigation or seek operation).

Figure 3:
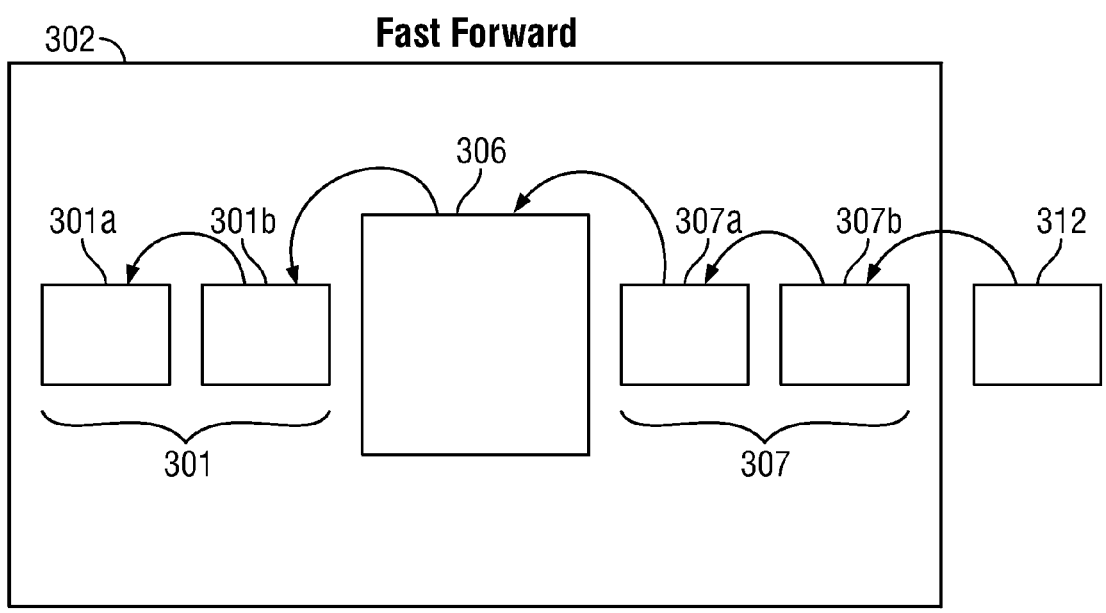

Referring now to FIG. 3, during a fast forward operation, image 301A disappears and appears to have moved off the screen to the left. Image 301B replaces image 301A, and concurrently the image in position 306 moves leftward to position 301 to replace image 301B. Image 307A moves leftward into the second position 306. Image 307B moves leftward to replace image 307A. A new image 312 from among the previously downloaded still images replaces the image 307B. As a result, the user appears to be moving through the program at fast-forward speed in the direction indicated by the arrow at the bottom of FIG. 3.

In an embodiment, repeated selection of a fast-forward button or rewind button on client device 150 causes the system to toggle through successive still images, and thus the user can rapidly advance at periodic intervals through the program. Alternatively, the same function may be implemented in response to a user pressing and holding a fast-forward or rewind button.

In another embodiment, dragging the slider of a media-player application causes the system to toggle through successive still images. The rate at which the user drags the slider across the screen can be used by the system to determine the rate of display of successive still images.

Movement icon 320 indicates a speed of fast-forward or rewind operation among multiple available speeds. In an embodiment, repeated selection of a fast-forward button or rewind button on client device 150 causes the system to toggle through successively higher movement speeds for the current trick-play mode (fast forward or rewind) until the highest movement speed is reached. Selecting the same button again then causes a return to the lowest available movement speed for that trick-play mode. As a movement speed changes, the movement icon 320 changes to illustrate the then-current speed.

Images move among different positions in screen display 302 at a greater or lesser speed depending on the selected movement of the progress bar. In an embodiment, a speed change may be accomplished by selectively skipping certain of the still images and not displaying them so that the program appears to be advancing more rapidly. Alternatively, a speed change may be accomplished by causing certain of the still frames in the first image position or the third image position never to be displayed in the second image position, but to jump directly to the opposite side of the screen into either the first image position or third image position as appropriate. For example, in the arrangement of FIG. 3, to implement a faster speed still image 307A might move directly to the position of still image 301B or still image 301A and might never appear in the second position 306. Alternatively, a speed change may be accomplished by changing the amount of time during which each of the still images is displayed on the screen—that is, the presentation time of the images. A combination of two or more of these techniques also may be used.

The rate of display of the still images may be used to give the appearance of faster or slower progression through the program material. For example, if still images have been collected at 10-second program intervals, then displaying one still per second gives the appearance of progressing through the program material at 10 times ("10×") the normal viewing speed, displaying every second still image at two-thirds of a second per still gives the appearance of 30 times the normal speed, displaying every fourth still image at half second intervals gives the appearance of 80 times normal speed, and so on. Thus, the rate of display of the still images may be used to hint at higher speeds of traversing the program material but does not stress the output generator 165 in the way that displaying all the frames of the program material at the equivalent rate of display would stress the output generator 165.

Progress bar 322 may illustrate a relative amount of the video program that has been played and may also include one or more markers, such as vertical bars, to indicate relative positions within program of the still images that are shown in display 302. One or more of the still images of display 302 may be indicated in the progress bar 322. For example, the progress bar 322 may comprise a marker only for the still image in the second image position 306.

In some embodiments, the progress bar is included within a slider component of a media-player application. In such embodiments, the slider may be used to invoke trick-play operations by selecting and dragging the slider forward or backward using a cursor-control device such as a mouse or touch-screen display.

Figure 4:
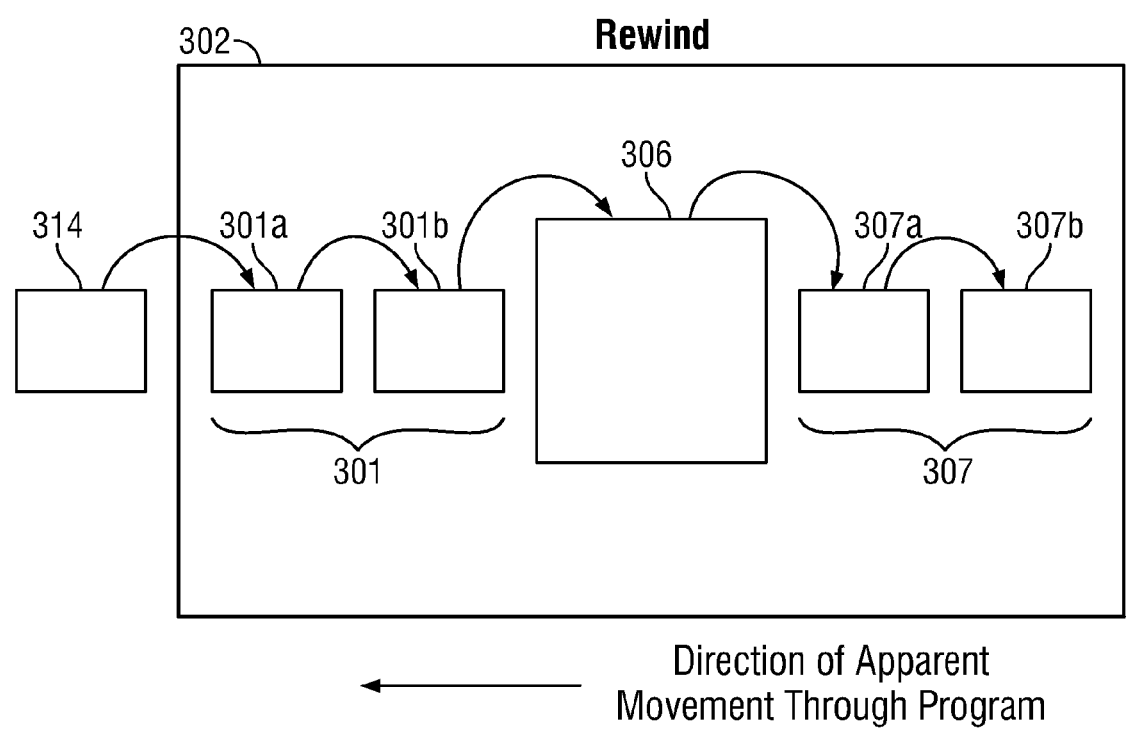

FIG. 4 illustrates movement of the still images of FIG. 2 in a rewind operation. When a rewind trick-play mode is selected, the still images in screen display 302 move as indicated above for FIG. 3 but in an opposite direction. For example, a new still image 314 replaces still image 301A in position 301, and image 301A moves rightward to replace image 301B. Concurrently, image 301B moves into the second position 306. The image at second position 306 moves rightward to replace image 307A, which moves to replace image 307B. The previously displayed image 307B appears to disappear off the screen to the right. As a result, the display appears to be rewinding the audiovisual media to move through the program in the direction indicated by the arrow at the bottom of FIG. 4.

In an embodiment, each still image that is displayed in the second image position 306 is displayed in a size larger than the sizes of images in first and second image positions 301, 307. This approach gives the second image position 306 more prominence and gives the user a focal point while still providing the user with image references in the first and second positions 301, 307 to indicate what came before and what comes next.

As previously mentioned, in conventional streaming systems the server creates for each given media content item (e.g., program) a series of manifest files with different encoding parameters (e.g., bit rates, resolutions, etc.). The client device downloads these manifest files. The client device determines available network bandwidth and selects the appropriate manifest file and sequentially plays the media segments specified within the manifest file. The client device periodically monitors the available bandwidths and downloads/updates updated manifest files accordingly.

Thus, the manifests created by the server in a conventional system are available to all clients and are not tailored or otherwise uniquely created on a per client basis. As discussed below, in various embodiments discussed herein the server creates manifests on a per client basis and maintains the state of each client. That is, the server builds unique manifests, which are generally subsets of a master manifest for each client for a particular use case. Illustrative use cases that will be discussed include Live on Demand (LoD) or Start Over (SO), Video on Demand (VoD), Fast Forward (FF) and Fast Rewind (FREW). Each unique manifest file is built to enable each client device to have random access to a master manifest without having to fetch or download a manifest file that includes an entire program.

Figure 5:
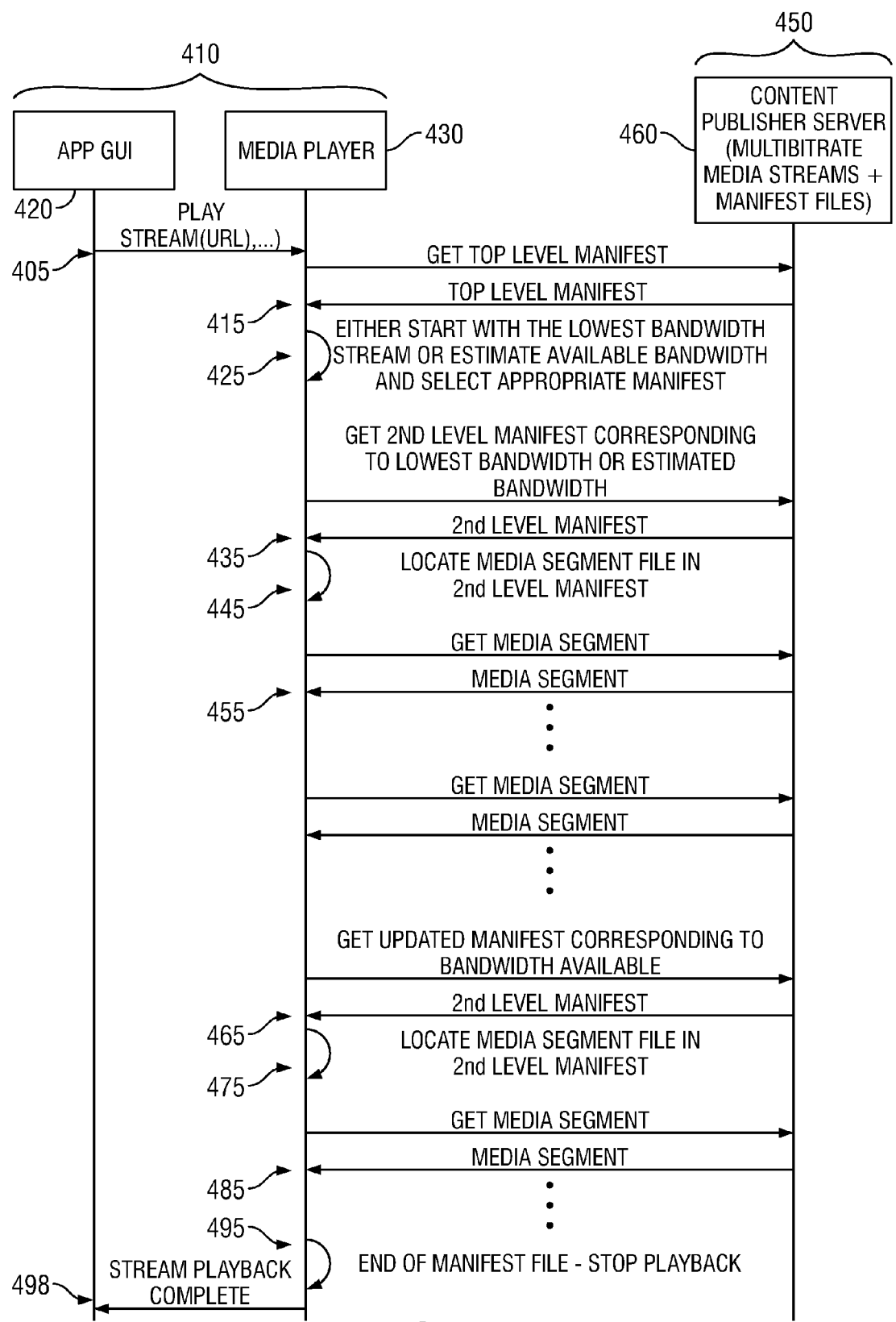
FIG. 5 is a message flow diagram between a client and server for illustrating hypertext transfer protocol ("HTTP") based live streaming ("HLS") in a first use case.

FIG. 5 is a message flow diagram between client device 410 and server 450 for illustrating HLS streaming media in a first use case. In this use case the client device is requesting to view a program from its beginning. If the program is being presented live, the client device is requesting to view the program at its start time. Flows related to security between the client components 410 and server components 450 have been omitted for clarity.

Client device 410 may include an application graphic user interface ("App GUI") 420 and media player 430. Server 450 may include a content-publishing server 460 which may be configured to store or produce multi-bitrate media steams and manifest files.

In a first step 405, a user navigates through program listings and selects a video program for viewing. In some embodiments, the video program is linked to a URL pointing to a high-level manifest. In a next step 415, the media player 430 requests and receives a top- or high-level manifest file for the video program that includes information about variant manifest files with video streams having different encoding parameters.

In a next step 425, the media player 430 looks at the high-level manifest and either starts by requesting the lowest (or highest) bandwidth manifest file or optionally performs some bandwidth availability estimation and selects the corresponding bandwidth manifest file.

In step 435, media player 430 requests and receives a 2nd level manifest file for the corresponding bandwidth it desires. In step 445, media player 430 determines that the 2nd level manifest is operating in rolling mode and contains the first 10 second of the program in 10 one-second media segments. These media segments may be denoted, for instance, as chunk_1.ts to chunk_10.ts.

In a step 455, media player 430 requests the media-segments in succession. In a step 465, after say, 15 seconds have passed, media player 430 requests and receives an updated manifest file which has 10 URL entries denoted as chunk_6.ts to chunk_16.ts. In step 475 the media player 430 locates the media segments in the manifest and requests the segments in succession in step 485. The media player 430 periodically requests and receives updated manifest files in this manner as they are published by the server 450. The updated manifest files contain a sliding window of 10 one-second media segments. The media player 430 can play the media and present it to the user while the aforementioned steps are being performed.

In a next step 495, when the end of the manifest file is reached, the media player 430 signals the App GUI 420 that playback of the video program is complete. This signaling that the stream playback is complete is shown as step 498.

Figure 6:
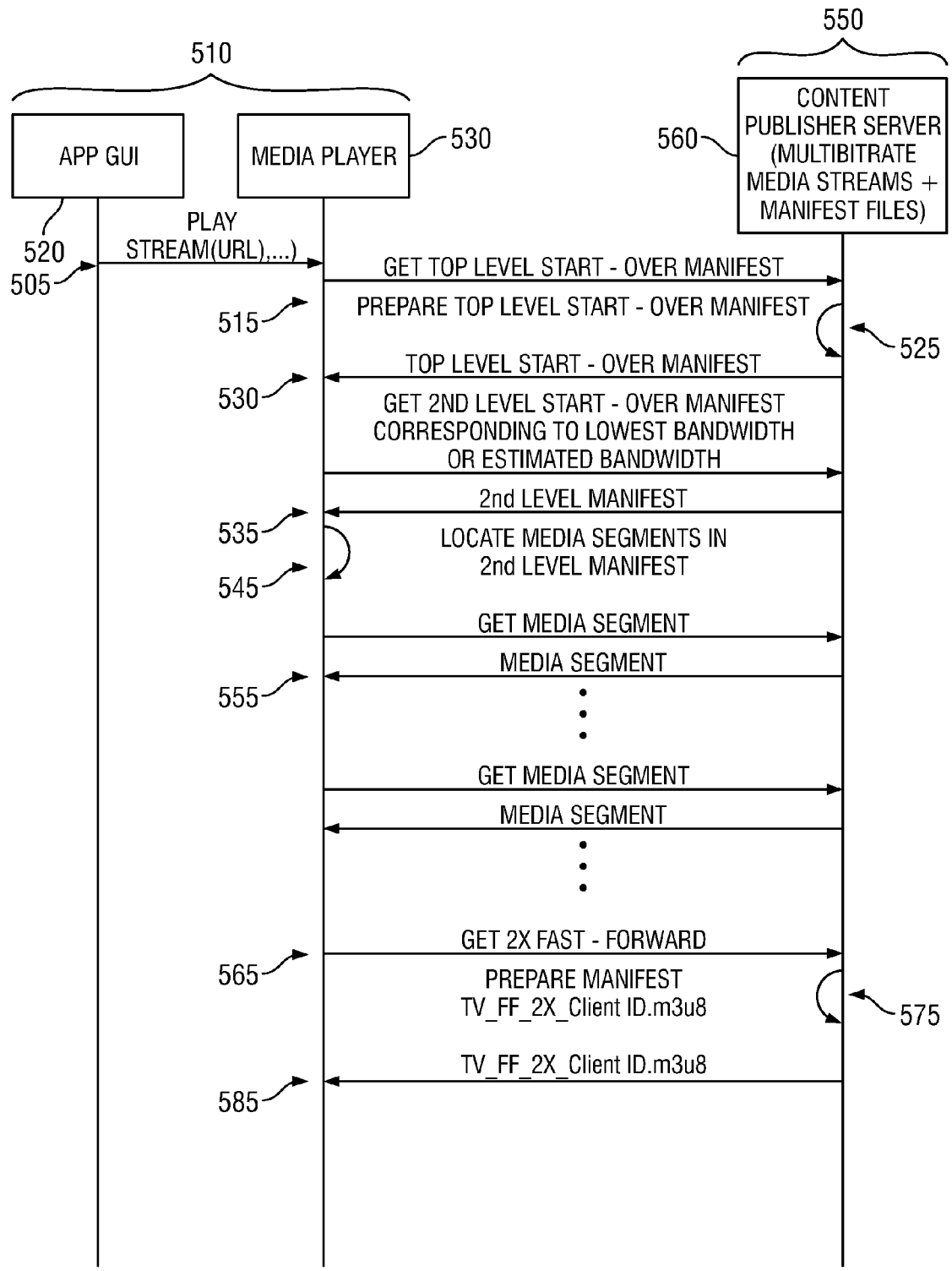
FIG. 6 is a message flow diagram between a client and server for illustrating HLS in a first use case.

FIG. 6 is a message flow diagram between a client device 510 and server 550 for illustrating HLS streaming media in a second use case. In this use case client device 510 is requesting to receive a live video program from its beginning after it has already started. This use case is also applicable to a situation in which client device 510 wants to execute a "start over" feature.

Similar to client device 410, client device 510 may include an application graphic user interface ("App GUI") 520 and media player 530. Similar to server 450, server 550 may include a content-publishing server 560 which may be configured to store or produce multi-bitrate media steams and manifest files.

In a first step 505, a user navigates through program listings and selects a live video program for viewing. In this case the program is already in progress. In step 515, the media player 530 requests and receives a top-level start-over manifest file for the video program to join the program from its beginning.

Upon receiving the start-over request, instead of sending the client device the current manifest file with a rolling window that encompasses the current portion of the program, the server 350 prepares a new top-level start-over manifest for client device 510 in step 525. The new manifest, which may be denoted SO.m3u8, for example, operates in rolling mode and contains the first 10 seconds of the program in 10 one-second media segments.

The server 550 maintains in memory or the like an association between the start-over manifest SO.m3u8 and the client device 510, using any suitable client identifier such as an IP address, for example. The server 550 may generate the start-over manifest SO.m3u8 when the client device 510 requests it or in advance of such a request. The server 550 sends the manifest file to the client device 510 in step 530.

Subsequent steps proceed similar to those described above in connection with FIG. 5.

For instance, in step 535 media player 530 requests a 2nd level start-over manifest file for the corresponding bandwidth it desires. That is, the media player 530 looks at the high-level manifest file SO.m3u8 and either starts by requesting the lowest bandwidth manifest file or optionally performs some bandwidth availability estimation and selects the corresponding bandwidth manifest file.

In step 545, media player 530 locates the media segments and determines that the 2nd level start-over manifest is operating in rolling mode and contains the first 10 second of the program in 10 one-second media segments. These media segments are the first ten segments of the program, which were previously denoted as chunk_1.ts to chunk_10.ts.

In step 555, media player 530 requests the media-segments in succession from manifest file SO.m3u8. As before, the media player 530 periodically requests and receives updated manifest files as they are published by the server 550. The updated manifest files contain a sliding window of 10 1-second media segments.

Another use case can be illustrated by continuing with the example shown in FIG. 6. In this example the user of client device 310 wishes to employ a fast-forward trick-play mode to catch up to the live program.

Continuing with FIG. 6, client device 510 sends the server 530 a fast-forward request in step 565. In this example the client device requests a speed of two times ("2×") normal speed. In response, the server 530 prepares a modified manifest file in step 575 that may be denoted, for example, by TV_FF_2×_ClientID.m3u8. That is, the server 550 prepares a manifest file that is specifically tailored to satisfy the request of client device 510. The server 550 may generate the modified manifest file TV_FF_2×_ClientID.m3u8 when the client device 510 requests it or in advance of such a request. The server 550 sends the manifest file to the client device 510 in step 585.

The server 550 will modify the manifest file to include a window of URLs starting from the client device's current position in the program. State information concerning the client device which allows the server 550 to know the current position of the client device in the program may be obtained in a number of different ways. In this example, when the client device 510 switches from normal play to fast-forward play, the server 510 knows what media segment was last read by the client device and can thus update the modified manifest file TV_FF_2×_ClientID.m3u8 beginning with that media segment or the subsequent media segment For example, assume the client device last read media segment 30 when it requests operation in 2× fast-forward mode. Assuming once again that each media segment is 1 second in duration, the manifest file TV_FF_2×_ClientID.m3u8 that is provided will contain the following entries:

chunk_30.ts,
chunk_32.ts
chunk_34.ts,
chunk_36.ts
chunk_38.ts,
chunk_40.ts

Thus, every other one of the consecutive media segments is skipped when fast-forwarding at 2× the normal rate. It should be noted that in this example the size of the window has not changed, maintaining a total duration of 10 seconds. As the client device continues to fast-forward through the program, the manifest file will be updated with a sliding window. In the more general case, if the client device requests a trick play mode of operation that presents the media content at a rate N (N being an integer greater than one) times a normal presentation rate, every (N−1) out of N successive media segments will be excluded or otherwise skipped from the manifest file. Thus, when the client plays the media it will result in a presentation that appears to be playing in a fast-forward mode of operation.

In general, since different users will initiate the fast-forward function at different points in a program, different client devices will be served with different content using a manifest file TV_FF_N×_ClientID.m3u8 associated with their client ID when fast-forwarding through a program at N times the normal rate. Of course, if two client devices begin fast-forwarding through a program at the same point and at the same rate, they may be presented with the same manifest file.

A similar approach can be used when a client device fast rewinds through a program, but with the media segments in reverse order. For instance, if a client asks to fast rewind at 4× the normal rate, the server will prepare the manifest file TV_FRW_4×.m3u8. The window of media segments included in this manifest file may begin with the last media segment read by the client device. Thus, if the client asks to fast rewind through the program after reading the $30^{th}$ one second media segment, the server will prepare the manifest file TV_FRW_4×_ClientID.m3u8 with the following entries:

chunk_30.ts,
chunk_26.ts
chunk_22.ts,
chunk_18.ts
chunk_14.ts,
chunk_10.ts

Thus, when asking to fast rewind at 4× the normal rate, 3 out of every four media segments are skipped. One again, in this example the total duration of the media segments included in the manifest file is limited to 10 seconds. Also, as with the fast forward function, since different users will initiate the fast rewind function at different points in a program, different client devices will be served with different content using a manifest file TV_FRW_N×_ClientID.m3u8 associated with their client ID when fast-rewinding through a program at N times the normal rate.

Signaling between the server and client for allowing the client to communicate its status and desired playback mode of operation and for retrieving manifest files and media segments may be accomplished in any of a variety of different ways. For example, in some embodiments protocols such as the well known Simple Object Access Protocol (SOAP), session initiation protocol (SIP) or Internet Protocol Multimedia Subsystem (IM) may be employed.

Another signaling protocol that may be employed is the Representational State Transfer (REST) protocol. REST defines a manner for retrieving, posting, updating, and deleting Web content. In the REST protocol, application state and functionality are divided into resources, each of which is uniquely addressable through a URL. Interactions with REST resources generally involve targeting a resource with a URL, passing the resource one or more parameters, and issuing one of a small set of commands. These commands include GET, POST, PUT, and DELETE, for retrieving, updating, adding, and deleting information, respectively.

For example, the REST protocol may be used as follows to acquire a manifest file that satisfies a client request to invoke a seek function to jump forwards or backwards in a program:

GET http://192.168,0.121/tuner/manifest/106.m3u8?o=<offset-in-seconds>

In this example the GET operation is used with the newly defined parameter <offset-in-seconds>, which can be positive or negative and causes the current position in the program to shift by N seconds.

Additional parameters may be defined to perform additional functions. For example, as discussed above trick play modes such as fast forward and fast rewind may be accomplished by preparing manifest files in which media segments are eliminated or otherwise skipped. This function can be implemented using a parameter <skip-M-chunks> which causes the manifest file to skip over every M media segments. Fast rewind can be implemented by making M negative, which causes the media segments to listed in reverse order, with the appropriate number of media segments being skipped. A value of M equal to zero may be used to indicate that a reverse scan at normal speed is desired. If the client tries to advance past the latest time available from the server, access may be given to the media segment at that latest time. Likewise, if the client attempts to rewind prior to the earliest media segment available from the server, access may be given to the earliest available media segment instead. That is, if the client tries to advance or rewind to a point in the program beyond what is available, the client will be provided with media segments and not an error message. In this way the behavior of a traditional DVR can be mimicked.

The client can invoke a function such as pause without the use of any additional parameters since the client does not request any media segments when pausing and the server will naturally maintain the last client's last position in the program. In some cases, however, it may be desirable to use an explicit <pause> parameter in order to avoid use of server resources for an extended period of time simply because the client might have paused the program.

Of course, it should be noted that the parameters defined above are only illustrative of the types of parameters that may be employed and are not intended as a limitation on the subject matter described herein.

In some implementations it may be desirable to define additional tags that can be used with the manifest files. For example, two private tags, #PRIVATE_TAG_EXT_BEFORE and #PRIVATE_TAG_EXT_AFTER may be used to describe the number of seconds of content available from the server before and after, respectively, the media segments that are currently being provided. In this way the client will be directly aware of its position in the program. For instance #PRIVATE_TAG_EXT_BEFORE 100 may indicate to the client that 100 media segments are available before the media segments currently included in the manifest file. Likewise, #PRIVATE_TAG_EXT_AFTER 2 may indicate to the client that there are 2 media segments available after the media segments currently included in the manifest file. Of course, the formats and attributes that are used for these newly defined tags are not limited to the particular examples presented above.

Figure 7:
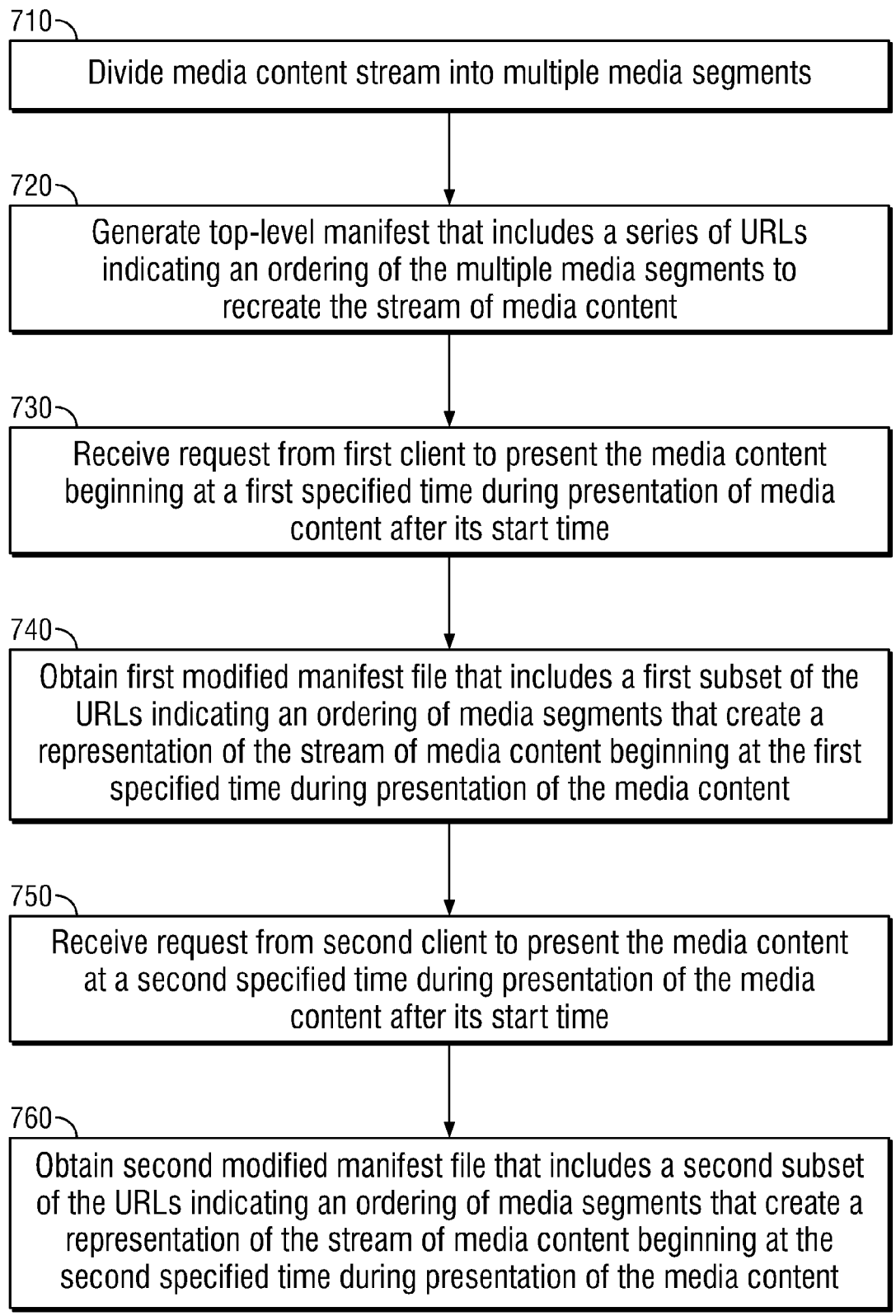
FIG. 7 is a flowchart showing one example of a method for preparing media content to be streamed to a client.

FIG. 7 is a flowchart showing one example of a method for preparing media content to be streamed to a client. The method begins at block 710 when a media content stream is divided by a server into multiple media segments. Each of the multiple media segments is to be stored as an individual file in a memory in a transfer protocol compliant format such as HLS, for example. Next, at block 720 a top-level manifest file is generated. The top-level manifest includes a series of Universal Resource Indicators (URLs). The series of URLs indicate an ordering of the multiple media segments to recreate the stream of media content.

At block 730 the server receives over a network a request from a first client to present the media content beginning at a first specified time during presentation of the media content after its start time. In response to the request, the server generates or otherwise obtains at block 740 a first modified manifest file based on the top-level manifest file. The first modified manifest file includes a first subset of the URLs indicating an ordering of media segments that create a representation of the stream of media content beginning at the specified time in the media content.

The server next receives at block 750 a request from a second client to present the media content at a second specified time during presentation of the media content after its start time. This second specified time requested by the second client may be different from the first specified time requested by the first client. In response to the request from the second client, the server generates or otherwise obtains a second modified manifest file at block 760 based on the top-level manifest file. The second modified manifest file includes a second subset of the URLs indicating an ordering of media segments that create a representation of the stream of media content beginning at the second specified time in the media content.

Aspects of the subject matter described herein are operational with numerous general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules or components, being executed by a computer. Generally, program modules or components include routines, programs, objects, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Figure 8:
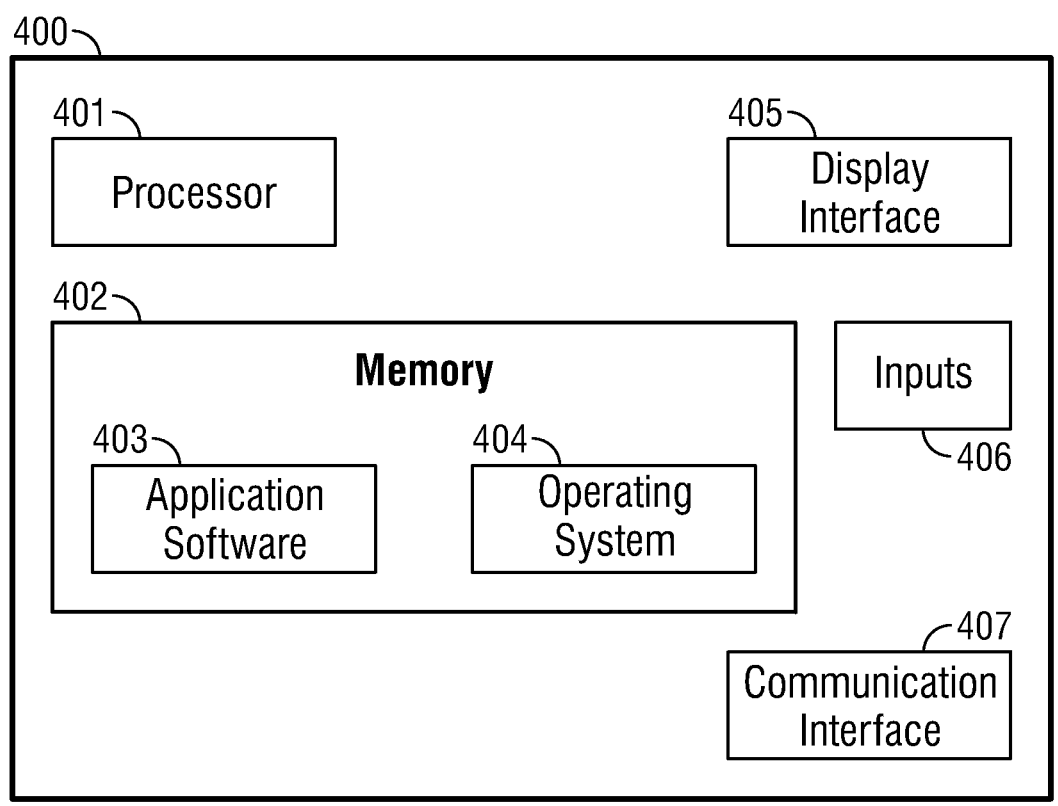
FIG. 8 illustrates various components of an illustrative computing-based device in which the server and/or client shown in FIG. 1 may be implemented.

FIG. 8 illustrates various components of an illustrative computing-based device 400 which may be implemented as any form of a computing and/or electronic device, and in which embodiments of a server and/or a client as described above may be implemented.

The computing-based device 400 comprises one or more inputs 406 which are of any suitable type for receiving media content, Internet Protocol (IP) input, activity tags, activity state information, resources or other input. The device also comprises communication interface 407 to enable the device to communicate with one or more other entity using any suitable communications medium.

Computing-based device 400 also comprises one or more processors 401 which may be microprocessors, controllers or any other suitable type of processors for processing computing executable instructions to control the operation of the device in order to provide a search augmentation system. Platform software comprising an operating system 404 or any other suitable platform software may be provided at the computing-based device to enable application software 403 to be executed on the device.

The computer executable instructions may be provided using any computer-readable media, such as memory 402. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system integral with or in communication with the computing-based device. A display interface 405 is provided to control a display device to be used in conjunction with the computing device. The display system may provide a graphical user interface, or other user interface of any suitable type.

As disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable storage media for storing information. The term "computer-readable storage medium" includes, but is not limited to, portable or fixed storage devices, optical storage devices, wireless channels, a SIM card, other smart cards, and various other mediums capable of storing, containing, or carrying instructions or data. However, computer readable storage media do not include transitory forms of storage such as propagating signals, for example.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable storage medium and executed by one or more processors.

Although the subject matter has been described in language specific to structural features and/or methodological acts, it is to be understood that the subject matter defined in the appended claims is not necessarily limited to the specific features or acts described above. Rather, the specific features and acts described.

The invention claimed is:

1. A method of preparing media content to be streamed to a client, the method comprising:
   dividing, at a server, a stream of the media content into multiple media segments or chunks, each of the multiple media segments or chunks to be stored as an individual file in a memory in a transfer protocol compliant format;
   generating a top-level manifest file having a plurality of Universal Resource Locators (URLs), the plurality of URLs indicating an ordering of the multiple media segments or chunks to recreate the stream of media content; and
   responsive to a client request received over a network to present the media content in a trick play mode of operation, obtaining a modified manifest file based on the top-level manifest file, the modified manifest file comprising a subset of the plurality of URLs indicating an ordering of media segments or chunks that create a representation of the stream of media content presentable in the trick play mode of operation while excluding a number of the multiple media segments or chunks from the ordering.

2. The method of claim 1, wherein the trick play mode of operation presents the media content at a rate N times a normal presentation rate, N being an integer greater than one, the subset of the plurality of media segments excluding every (N−1) out of N successive media segments.

3. The method of claim 2, wherein the trick play mode is a fast-forward or fast-rewind mode of operation.

4. The method of claim 1, wherein the subset of the plurality of updated multiple media segments begin with a last media segment read by the client prior to receiving the client request.

5. The method of claim 1, wherein the modified manifest file is a rolling manifest file with a limited number of URLs in which URLs are removed on a rolling basis to thereby providing a sliding window of media content segments accessible to the client.

6. The method of claim 1, wherein the server and the client communicate with one another over a local area network (LAN).

7. The method of claim 1, wherein the client request is received in accordance with a Representational State Transfer (REST) protocol.

8. The method of claim 7, wherein the client request that is received includes a REST command to retrieve the modified manifest file, the REST command having a parameter associated therewith for specifying the trick play mode of operation and a rate of play at which the trick play mode is to present the media content item.

9. A method of preparing media content to be streamed to a client, the method comprising:
   dividing, at a server, a stream of the media content into multiple media segments, each of the multiple media segments to be stored as an individual file in a memory in a transfer protocol compliant format;
   generating a top-level manifest file having a plurality of Universal Resource Locators (URLs), the plurality of URLs indicating an ordering of the multiple media segments to recreate the stream of media content; and
   responsive to a client request received over a network to present the media content in a trick play mode of operation, obtaining a modified manifest file based on the top-level manifest file, the modified manifest file comprising a subset of the plurality of URLs indicating an ordering of media segments that create a representation of the stream of media content presentable in the trick play mode of operation,
   wherein the manifest file includes a plurality of tags, a first of the tags indicating a number of media segments available before the media segments included within the sliding window and a second of the tags indicating a number of media segments available after the media segments included in the sliding window.

10. The method of claim 1, wherein the transfer protocol compliant format is hypertext transfer protocol (HTTP) based live streaming (HLS).

11. The method of claim 1, wherein the media content has a duration extending from a start time and the client request includes a request to present the media content at a specified time after the start time and wherein the subset of the plurality of URLs in the modified manifest file creates a representation of the stream of media content beginning at the specified time.

12. The method of claim 11, wherein the specified time corresponds to a last of the media segments read by the client prior to receiving the client request.

\* \* \* \* \*